April 7, 1931. H. F. HITNER 1,799,371
APPARATUS FOR MAKING GLASS
Filed May 23, 1927 6 Sheets-Sheet 2

April 7, 1931. H. F. HITNER 1,799,371
APPARATUS FOR MAKING GLASS
Filed May 23, 1927 6 Sheets-Sheet 3

INVENTOR
Harry F Hitner
by
James C Bruny
att'y

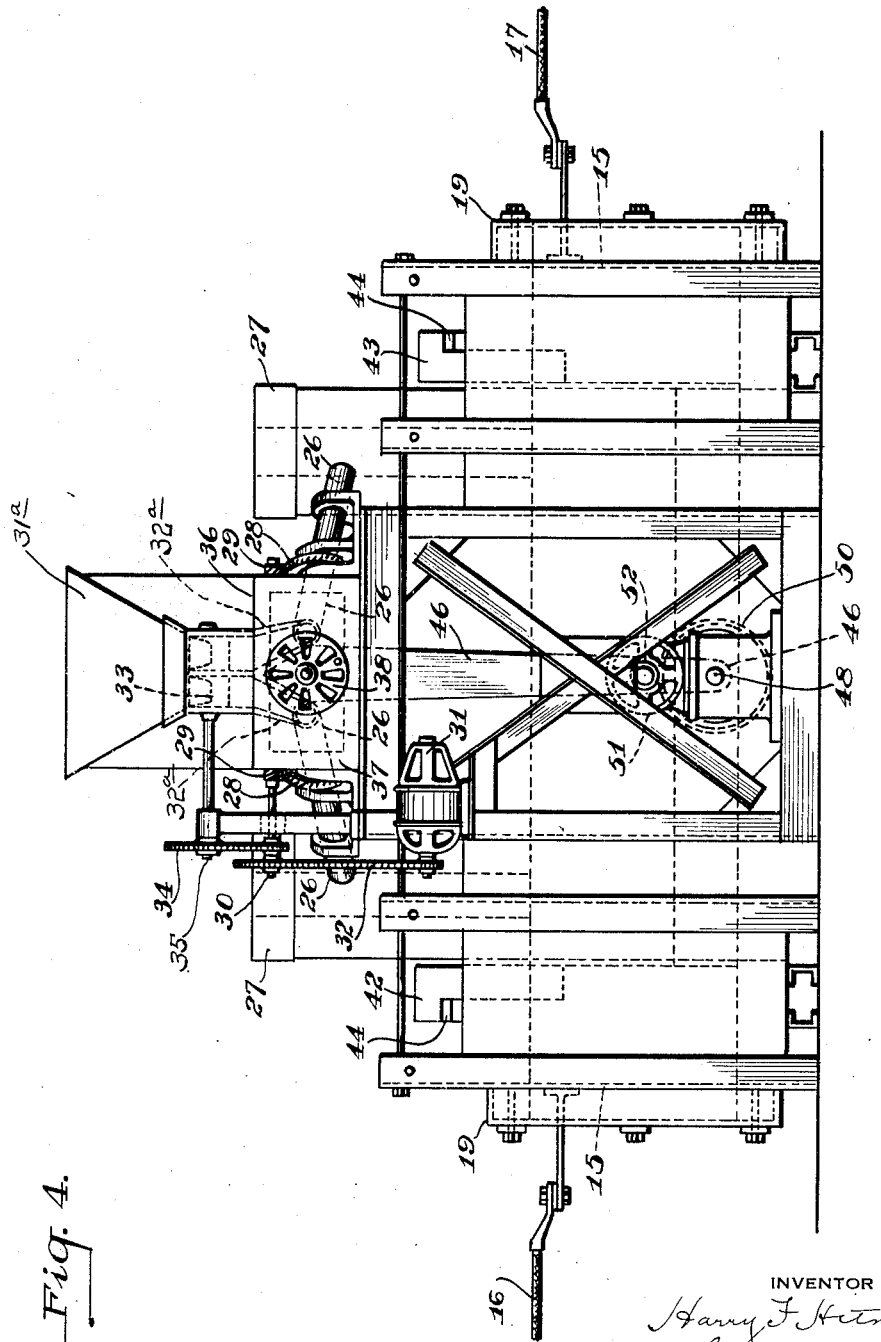

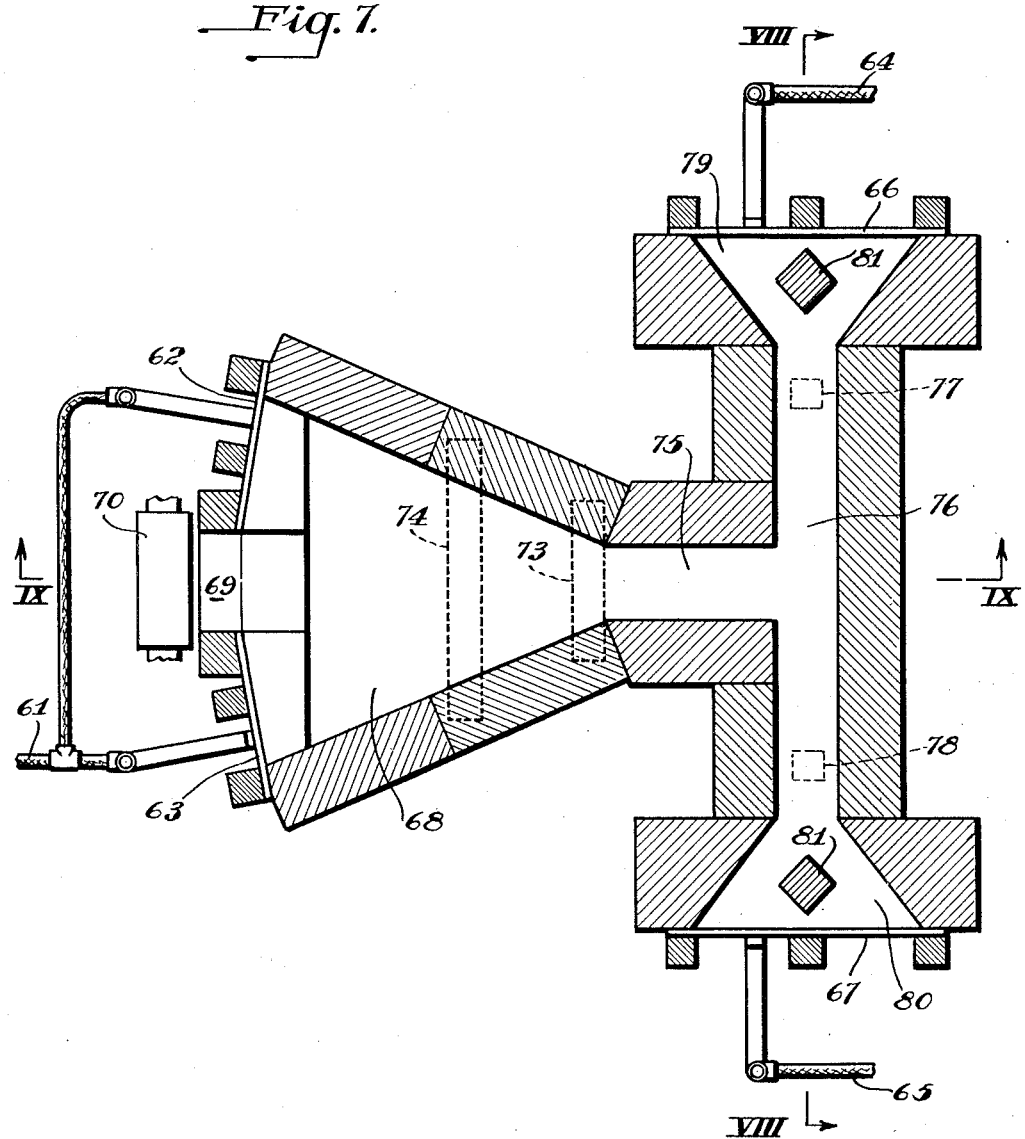

April 7, 1931.  H. F. HITNER  1,799,371
APPARATUS FOR MAKING GLASS
Filed May 23, 1927   6 Sheets-Sheet 6

INVENTOR
Harry F. Hitner
by
James L. Bradley

Patented Apr. 7, 1931

1,799,371

UNITED STATES PATENT OFFICE

HARRY F. HITNER, OF OAKMONT, PENNSYLVANIA, ASSIGNOR TO PITTSBURGH PLATE GLASS COMPANY, A CORPORATION OF PENNSYLVANIA

APPARATUS FOR MAKING GLASS

Application filed May 23, 1927. Serial No. 193,405.

Figure 1:
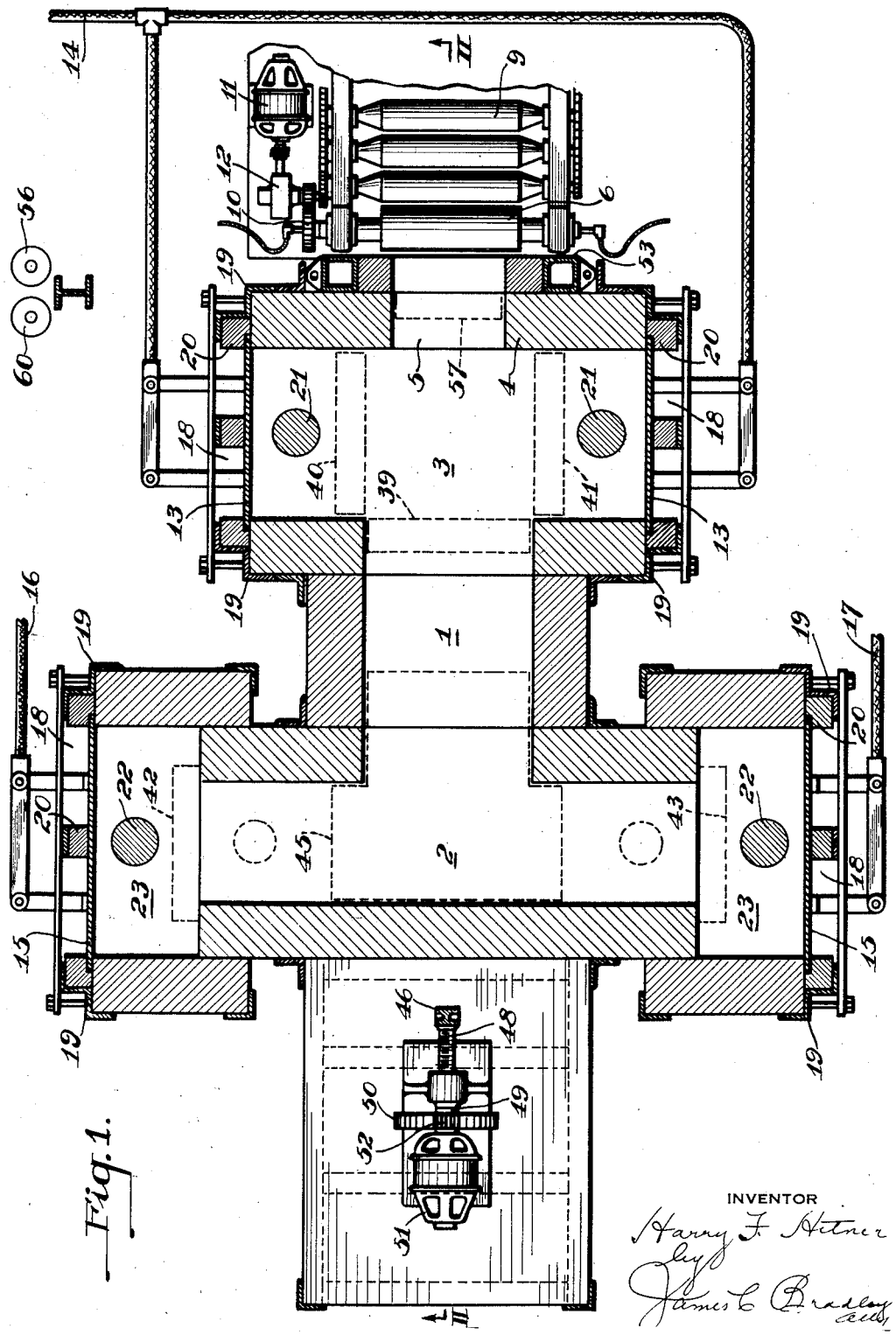
Figure 2:
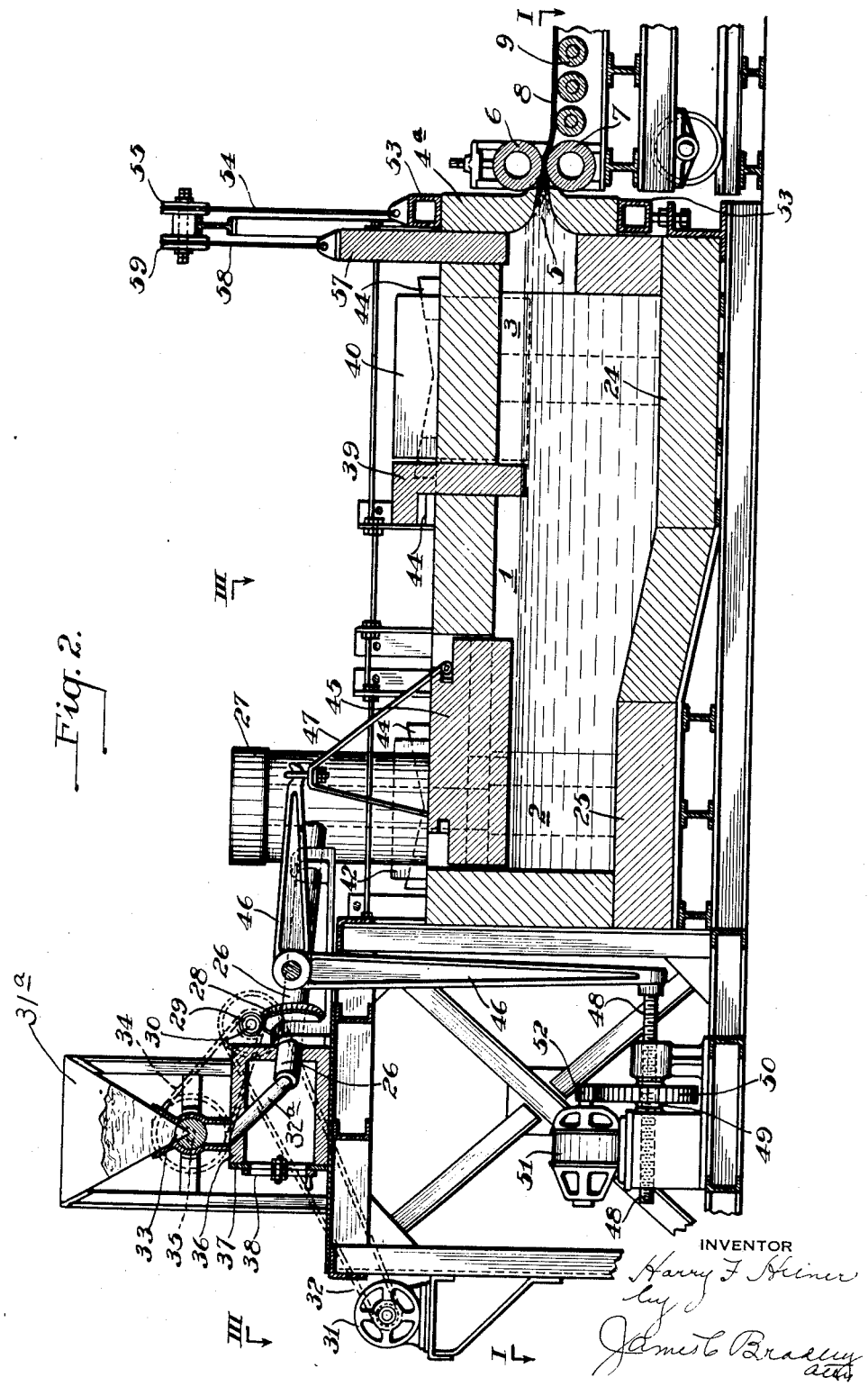
Figure 3:
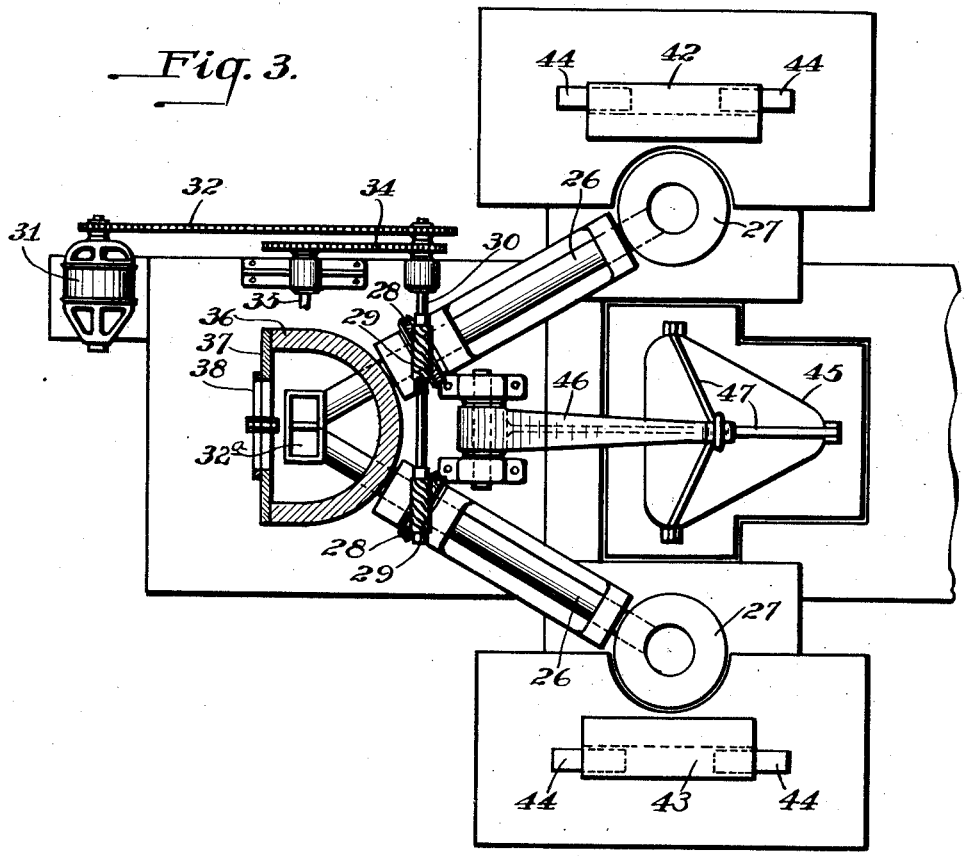
Figure 5:
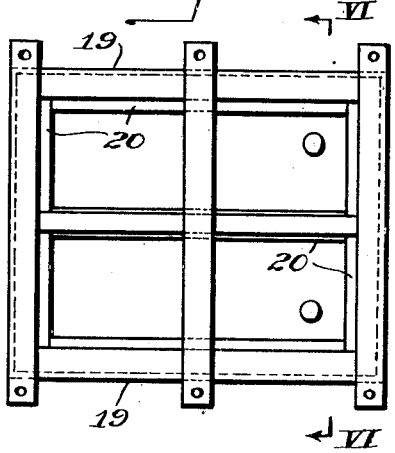
Figure 6:
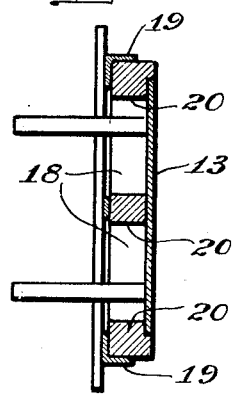
Figure 8:
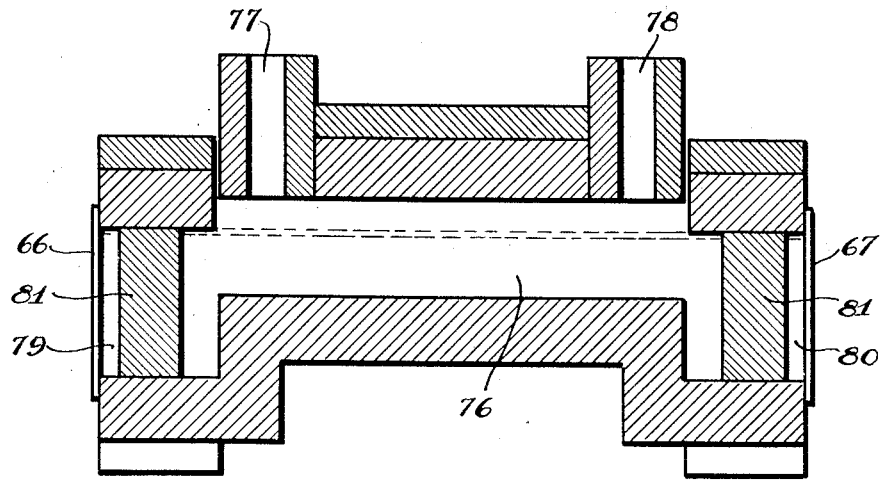
Figure 9:
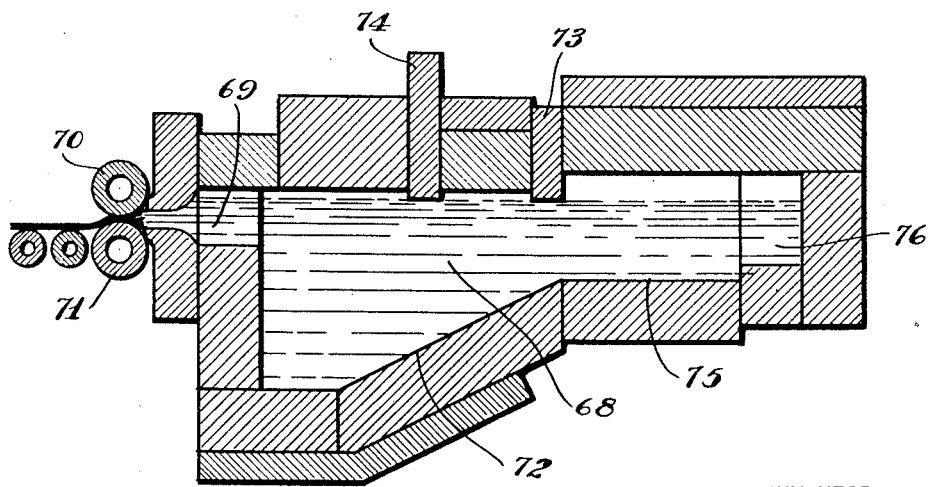

The invention relates to an apparatus for making glass and the like by the use of electricity as a melting and fining agency, the principal objects being to utilize the current so as to melt the bath and fine the glass econonically; to produce large quantities of glass in a furnace of relatively small size; and to produce a product of high quality without discoloration incident to the contact of the glass with the electrodes. The tank is shown as applied to the making of sheet glass, and this is one large and important field of usefulness, but it will be understood that the invention is applicable to the melting and fining of glass without any limitation as to the form which the product is to assume. In its preferred form, the invention contemplates the use of an elongated tank with an enlargement or bay at each end in whose end walls the electrodes are located, the batch being fed into the rear bay at two points, although the number of feed points might be increased or reduced to a single point. Three phase current is employed and provision is made for regulating the temperature of the glass in the melting section of the furnace by raising and lowering a top wall, this preferably being accomplished by means of a motor whose regulation may be made automatic, if desired, by the use of suitable devices dependent upon the amount of current consumed, or by the use of thermostatic devices exposed to the action of the heat in the tank or to the action of heated glass. One embodiment of the invention is illustrated in the accompanying drawings, wherein:

Figure 1 is a horizontal section on the line I—I of Fig. 2. Fig. 2 is a vertical section on the line II—II of Fig. 1. Fig. 3 is a horizontal section on the line III—III of Fig. 2. Fig. 4 is an elevation of the left hand end of the structure, as shown in Fig. 2. Figs. 5 and 6 are detail views showing the method of mounting the electrodes, Fig. 5 being an elevation and Fig. 6 a section on the line VI—VI of Fig. 5. Fig. 7 is a horizontal section through a modification. Fig. 8 is a section on the line VIII—VIII of Fig. 7. And Fig. 9 is a section on the line IX—IX of Fig. 7.

Referring to the drawings, the tank comprises a body portion 1 and a pair of bays 2 and 3 at the ends of the body portion, such bays extending transversely of the center line of the furnace and extending out past the sides of the body portion. The front wall 4 of the front bay 3 is provided with an outlet opening 5, and in opposition to this opening are the water cooled rolls 6 and 7, between which the ribbon or sheet of glass 8 may be withdrawn continuously over the rolls 9 and through a suitable leer. The rolls 6 and 7 have intermeshing spur gears 10 at their ends, and one of these gears is driven from the motor 11 through suitable reduction gearing in the casing 12.

The end walls of the front bay 3 comprise the electrode plates 13, 13 connected to the common terminal 14 of the three phase current supply. Similarly, the end walls of the rear bay 2 comprises the electrode plates 15, 15 connected respectively to the two other terminals 16 and 17 of the three phase current supply. When current is supplied to the electrodes, it passes between the electrodes 15, 15 and the electrodes 13, 13, thus traversing the length of both bays and the length of the body portion 1. These electrodes may be made of any suitable material having the requisite degree of refractoriness and conductivity, such as chromium iron alloy containing about 25 per cent of chromium. An alloy of this character has practically no discoloring effect upon the glass, if maintained at a temperature in the neighborhood of 1800 degrees F. In order to avoid too high a temperature due to the passage of the current, these electrode plates are made of relatively large size. For the same reason, in order that the glass in the bays may not be heated to too high a temperature and so react upon the metal, the cross sectional area, which carries the glass at the ends of the bays, is made relatively large as compared with the cross sectional area in the body of the tank shown. This permits the glass in the body 1 to be given a temperature high enough to melt and fine the glass, without producing any temperature at the ends of the bays sufficient to react with the metal.

in the electrodes. With proper proportions of the bays, as compared to the body 1, temperatures of 2700 to 2900 degrees F. may be easily maintained in the body portion of the tank and in the central portion of the rear bay, without a rise in temperature in the glass at the ends of the bays above 1900 degrees F. In order to still further promote the cooling of the electrodes 13, 13 and 15, 15, the outer sides of the plates are exposed directly to the atmosphere by the use of the windows or openings 18, 18, 18, etc., the plates being supported by metal frameworks 19, 19, etc. carrying the refractory lining material 20, 20, 20, etc. This arrangement will be most readily seen by reference to Figs. 5 and 6.

In order that certain parts of the electrode plates may not be overheated, the vertical baffle members 21, 21 and 22, 22 are employed, such baffle members being of refractory material, such as clay, circular in cross section, and located opposite the centers of the electrode plates. It is opposite these baffles, that the plates have a tendency to overheat, and experience has demonstrated that the use of these baffles remedies this condition. The erosive effect of the glass upon the clay of the baffles is less with baffles of a circular cross section than with baffles of a rectangular cross section. In order to increase the cross sectional area of the rear bay 2, at its ends as compared with the central portion of such bay, and as compared with the cross section of the body portion 1 of the tank, the enlargements 23, 23 are provided. These enlargements have their bottoms at the same level as the bottom 24 (Fig. 2) of the front bay 3, thus still further increasing the cross section of these ends as compared with that of the central portion of the rear bay and the body portion 1, whose bottom 25 (Fig. 2) is raised substantially above the level of the bottom 24. The amount of current, therefore, which passes through the central portion of the bay 2 and through the body portion per unit of cross section is much greater than that which passes through the ends of the rear bay 2 and through the front bay 3, so that the temperature in the central portion of the bay 2 and in the body portion is very much greater than in the ends of the rear bay and in the front bay. This reduction in area is also desirable in the central portion of the tank, as the batch requires a large amount of heat to reduce it to molten state, thus calling for a greater volume of current per unit of cross sectional area at the point where such batch is introduced.

The batch to be melted, is fed into the furnace continuously through the two feed pipes 26, 26 whose forward ends discharge into the vertical refractory stacks 27, 27. The pipes 26, 26 are provided at their rear ends with worm wheels 28, 28, driven by the worms 29, 29. The worm shaft 30 carrying these worms is driven from the motor 31 through the intermediary of the chain 32 passing around sprockets on the end of the motor shaft and on the end of the shaft 30. The pipes 26, 26 are preferably inclined and have their interiors spirally grooved, so that the rotation of the pipes carries the batch forward. The batch is supplied to the rear ends of the pipes 26, 26 from the hopper 31$^a$, having at its bottom a pair of pipes 32$^a$, 32$^a$, communicating with the ends of the pipes 26, 26. The inlets to the pipes 32$^a$, 32$^a$ are controlled by the feed wheel 33, having U-shaped cavities on one side. This wheel rotates slowly, and thus intermittently supplies the batch to the upper ends of the pipes 32$^a$, 32$^a$. The wheel blocks the upper ends of the pipes so as to prevent the escape of hot gases upward through these pipes. The wheel is rotated from the shaft 30 by means of a sprocket chain 34 passing around sprocket wheels on the wheel shaft 35 and the shaft 30. The refractory casing 36 (Fig. 3) surrounds the meeting ends of the pipes 26, 26 and 32$^a$, 32$^a$, such casing having on one side a plate 37 provided with a rotatable damper 38 for regulating the outflow of heated gases from the casing.

In order to still further assist in maintaining the desired degree of difference in temperature and control the foam action in different parts of the tank, curtain or shade blocks 39, 40, 41, 42 and 43 are employed, the location of such blocks being indicated by dotted lines in Fig. 1. These blocks project down through the roof of the furnace with their lower edges in contact with the glass, as indicated in Fig. 2, which shows the block 39 in cross section. The upper ends of these blocks are turned laterally and the wedges 44 are employed between the laterally turned ends and the top of the furnace to regulate the depth to which the lower edge of the block extends into the glass. These blocks prevent a flow of hot gases from one section of the furnace to another. The block 39 serves to maintain a greater difference of temperature between the body portion 1 and the bay 3 than would otherwise be possible. Similarly, the blocks 40 to 43 serve to provide a greater difference in temperature between the central portions of the bays and their end portions than would otherwise be the case. This gives relatively cool glass in the bays, thus reducing the tendency of the glass to react with the metal of the electrodes.

In order to provide for the regulation of the temperature of the melting portion of the furnace, a vertically movable top or roof section 45 is employed, such roof section being of T-shape in plan, as indicated by the dotted lines in Fig. 1. By raising this top, its heat reflecting capacity is decreased, so that the temperature in this part of the furnace may be increased or decreased at will. The top is supported upon a bell crank lever 46, whose horizontal arm is connected to the top section 45 by means of the hangers 47. The vertical arm of the lever has engaging its end the screw 48 operating through a block 49, which is rotated by the gear 50. This gear wheel is driven from the motor 51 by means of the pinion 52. If desired, the operation of this member may be made automatic by provision of suitable means, such means being regulated by the temperature of the glass or by the amount of current flowing through the glass. It is also possible to regulate the movement of the lever by suitable hand operating means.

The portion 4a of the front wall 4 of the bay 3 is preferably mounted in a metal frame 53, as indicated in Fig. 2, supported by a cable 54 passing over a pulley 55 and counterweighted by the weight 56 (Fig. 1). This serves to adjust the position of the outlet slot 5. Similarly, a cut-off gate 57 is provided back of the wall 4, which may be lowered to shut off the flow of glass, such gate being carried by a cable 58 passing over a pulley 59, counterweighted by the weight 60.

The construction of Figs. 7, 8 and 9 is also designed to be used with three phase current, one of the terminals 61 being connected to the electrode plates 62 and 63 and the other two terminals 64 and 65 being connected to the elctrode plates 66 and 67. The front bay 68 is made in the tapering form shown in Fig. 7 and has an outlet slot 69 leading between the rolls 70 and 71, such rolls being supported and operated as in the construction of Figs. 1 to 4. The bottom wall or floor 72 of the front bay is inclined downwardly, as indicated in Fig. 9, so that the volume of glass carried in the bay is relatively large as compared with the cross section of the tank to the rear of the bay. This provides for a relatively lower temperature in this part of the tank, thus reducing the tendency to overheat the electrode plates 62 and 63 and discolor the glass as heretofore explained. Only two curtain blocks 73 and 74 are employed with this tank, such blocks being located, as indicated in Figs. 7 and 9, and being supported in any desired manner.

The body portion 75 of the tank and the central portion 76 of the rear bay are made relatively small in cross section, as will be seen by reference to Figs. 8 and 9, this portion of the tank constituting the melting section where a relatively high temperature is maintained for reducing the batch. This batch is fed in through the refractory conduits 77 and 78, located as indicated in dotted lines in Fig. 7. The extreme ends of the bay are tapered, as indicated at 79 and 80, making it possible to use relatively large electrodes and giving a cooler body of glass next to the electrodes than would otherwise be the case. The size of these end portions of the bay is also enlarged by deepening them (Fig. 8), so that they are about twice as deep as the central portion 76 of the bay. In front of each of the electrodes is a pillar or baffle 81, corresponding in function to the baffles 21 and 22 of the Fig. 1 construction. As above indicated, the construction provides for the securing of a relatively high temperature in the portions 75 and 76 of the tank with decreasing temperatures forward of the section 75, the construction also insuring that the electrode plates may always be maintained at a temperature such that they will not discolor the glass.

The tank and associated apparatus is suitable for the reduction of vitreous products other than those commonly referred to as glass, such as the vitreous enamels, which are a species of glass, and silicate of soda, which is sometimes referred to as soluble glass. It will be understood, therefore, that the term "glass" is used in its broad sense and that the furnace is not limited to use in the melting of the ordinary forms of glass.

What I claim is:

1. In combination in apparatus for making glass, a tank, a metal plate electrode constituting one of the walls thereof, a second electrode contacting with the glass in the tank at a point remote from said plate, a refractory baffle member in the form of a vertical pillar of circular cross section extending through the glass in the tank in front of said plate, and means for supplying electric current to said electrodes to cause a flow through the glass in the portion of the tank lying between the electrodes.

2. In combination in apparatus for making glass, a tank having a longitudinal portion with a transverse bay at its front end, electrodes constituting the end walls of such bay, means for withdrawing the glass from said bay, an electrode contacting with the glass at the rear end thereof remote from said bay, means for introducing batch to said rear end of the tank, and means for supplying current to said electrodes, the bottom of the tank at its rear end being at a level above that of the bottom of the bay.

3. In combination in apparatus for making glass, a tank, a metal plate electrode constituting one of the walls thereof, a second electrode for transmitting current to the glass in the tank at a point remote from said plate, a refractory baffle member extending vertically through the glass in the tank in front of said plate and in proximity thereto and means for supplying electric current to said electrodes to cause a flow through the glass in the portion of the tank lying between the electrodes.

4. In combination in apparatus for making glass, a tank, a metal plate electrode constituting one of the walls thereof, a second electrode contacting with the glass in the tank at a point remote from said plate, a refractory baffle in the form of a vertical pillar extending through the glass in the tank in front of said plate and in proximity thereto and means for supplying electric current to said electrodes to cause a flow through the glass in the portion of the tank lying between the electrodes.

In testimony whereof, I have hereunto subscribed my name this 21st day of May, 1927.

HARRY F. HITNER.